United States Patent [19]

Yoshida

[11] Patent Number: 5,235,622
[45] Date of Patent: Aug. 10, 1993

[54] CLOCK RECOVERY CIRCUIT WITH OPEN-LOOP PHASE ESTIMATOR AND WIDEBAND PHASE TRACKING LOOP

[75] Inventor: Shousei Yoshida, Tokyo, Japan
[73] Assignee: NEC Corporation, Japan
[21] Appl. No.: 720,929
[22] Filed: Jun. 25, 1991
[30] Foreign Application Priority Data
  Jun. 26, 1990 [JP] Japan .................................. 2-168846
  Jun. 26, 1990 [JP] Japan .................................. 2-168847
[51] Int. Cl.$^5$ ............................................ H04L 7/027
[52] U.S. Cl. ..................................... 375/106; 375/79;
  375/81; 375/120; 329/306; 329/307; 455/60;
  455/265
[58] Field of Search ................... 375/79, 81, 106, 111,
  375/113, 118, 120; 329/306, 307, 302, 323, 325,
  346, 358, 360, 361; 455/60, 265

[56] References Cited

U.S. PATENT DOCUMENTS

| | | | |
|---|---|---|---|
| 4,516,079 | 5/1985 | York ...................................... | 329/306 |
| 4,672,447 | 6/1987 | Möring et al. ...................... | 375/111 |
| 4,847,880 | 7/1989 | Kamerman et al. ................. | 375/106 |
| 5,065,412 | 11/1991 | Schenk ................................ | 375/111 |

OTHER PUBLICATIONS

*Preambleless Demodulator For Satellite Communications;* H. Tomita and J. Namiki, C&C Systems Research Labs., NEC Corporation, 1989 IEEE, pp. 16.4.1–16.4.5.

*Primary Examiner*—Curtis Kuntz
*Assistant Examiner*—Young Tse
*Attorney, Agent, or Firm*—Ostrolenk, Faber, Gerb & Soffen

[57] ABSTRACT

In a clock recovery circuit, a received APSK signal is sampled at a frequency N times higher than the transmitted clock in response to a first clock from a local clock source, and quantized into orthogonal digital APSK samples. An envelope of the orthogonal APSK digital samples is detected (3) and phase correlations are detected (5) between the envelope and locally generated orthogonal sinusoidal signals and averaged by a low-pass filter (6). The arctangent between the low-pass filtered orthogonal signals is detected (7) and applied to a subtracter (8). A threshold comparator (9) compares the subtracter output with N successive values. A digital V.C.O. (10) is supplied with an output signal from the comparator (9) to generate a sample clock $f_c$ at a frequency 1/N of the frequency of the first clock $f_s$ for sampling the digital samples from the A/D converter (1). A phase difference is detected by a phase comparator (12) between the second clock $f_c$ and the sample clock $f_c$, the phase difference being applied to the subtracter (8) in which the difference between it and the arctangent is determined. The V.C.O. (10) controls the timing of the sample clock in response to the first clock $f_s$ in accordance with the output of the threshold comparator (9).

7 Claims, 2 Drawing Sheets

CLOCK RECOVERY CIRCUIT WITH OPEN-LOOP PHASE ESTIMATOR AND WIDEBAND PHASE TRACKING LOOP

BACKGROUND OF THE INVENTION

The present invention relates generally to APSK (amplitude and phase shift keyed) modulation receivers, and more specifically to a clock recovery circuit for APSK signals.

As described in H. Tomita et al "Preambleless Demodulator For Satellite Communications," open-loop phase estimation is known for detecting a phase difference between transmitted clock and local clock. Such open-loop phase estimation is implemented with envelope detection, phase correlation, low-pass filtering and arctangent calculation. While satisfactory for detecting a phase difference during the period of a short packet, the phase estimation technique is not capable of tracking slow phase variations which may occur during a continuous transmission. Another technique which has been extensively used for recovering clock timing is the phase locked loop implemented by a phase detector, a loop filter, and a voltage controlled oscillator. An analog-to-digital converter is clocked by the VCO for sampling a received APSK signal and supplying the samples to the phase detector in which the phase difference between the sampling clock and the transmitted clock is detected. However, the PLL approach takes long to establish clock synchronization.

SUMMARY OF THE INVENTION

It is therefore an object of the present invention to provide a clock recovery circuit capable of establishing clock synchronization in a short, invariable length of time.

The object of the present invention is obtained by a quasi-open loop clock recovery circuit formed by an open loop phase estimator and a wideband phase tracking loop.

According to the present invention, there is provided a clock recovery circuit which comprises a clock source for generating a first clock at a frequency N times higher than the clock frequency of a received APSK signal. An A/D (analog-to-digital) converter samples the orthogonal APSK signals in response to the first clock and quantizes the APSK samples into orthogonal digital APSK samples. An envelope detector is coupled to the A/D converter for generating a signal representative of the envelope of the orthogonal APSK digital samples. From the first clock orthogonal sinusoidal signals are derived having a frequency which is 1/N of the frequency of the clock. Phase correlations are detected between the orthogonal sinusoidal signals and the envelope representative signal for coupling to a low-pass filter in which the phase correlations are averaged. An arctangent calculator is coupled to the low-pass filter for calculating the arctangent between the low-pass filtered orthogonal signals. A frequency divider is connected to the clock source for generating a second clock at a frequency which is 1/N of the frequency of the first clock. A phase difference is detected by a phase comparator between the second clock and a sample clock which is generated at a frequency 1/N of the frequency of the first clock by a digital voltage-controlled oscillator, the phase difference being applied to a subtracter in which it is subtracted from the output of the arctangent calculator. A threshold comparator is provided for comparing the output of the subtracter with N successive reference values for generating one of N output values respectively corresponding to the N reference values if the output of subtracter corresponds to one of the reference values. The reference values are preferably given by $(2\pi/N) \times M$, where M is an integer in the range between 1 and N. In response to the first clock, the digital V.C.O. controls the timing of the sample clock N times during the interval between successive sampling instants in accordance with the output of the threshold comparator. The sample clock is applied to a sampler for sampling the digital samples from the A/D converter.

In a preferred embodiment, an interpolator is coupled to the output of the sampler for receiving samples therefrom in response to the sample clock from the V.C.O. as candidate values and interpolating a sample which may exist between the candidate values in accordance with the output of the subtracter.

BRIEF DESCRIPTION OF THE DRAWINGS

The present invention will be described in further detail with reference to the accompanying drawings, in which.

DETAILED DESCRIPTION

Figure 1:
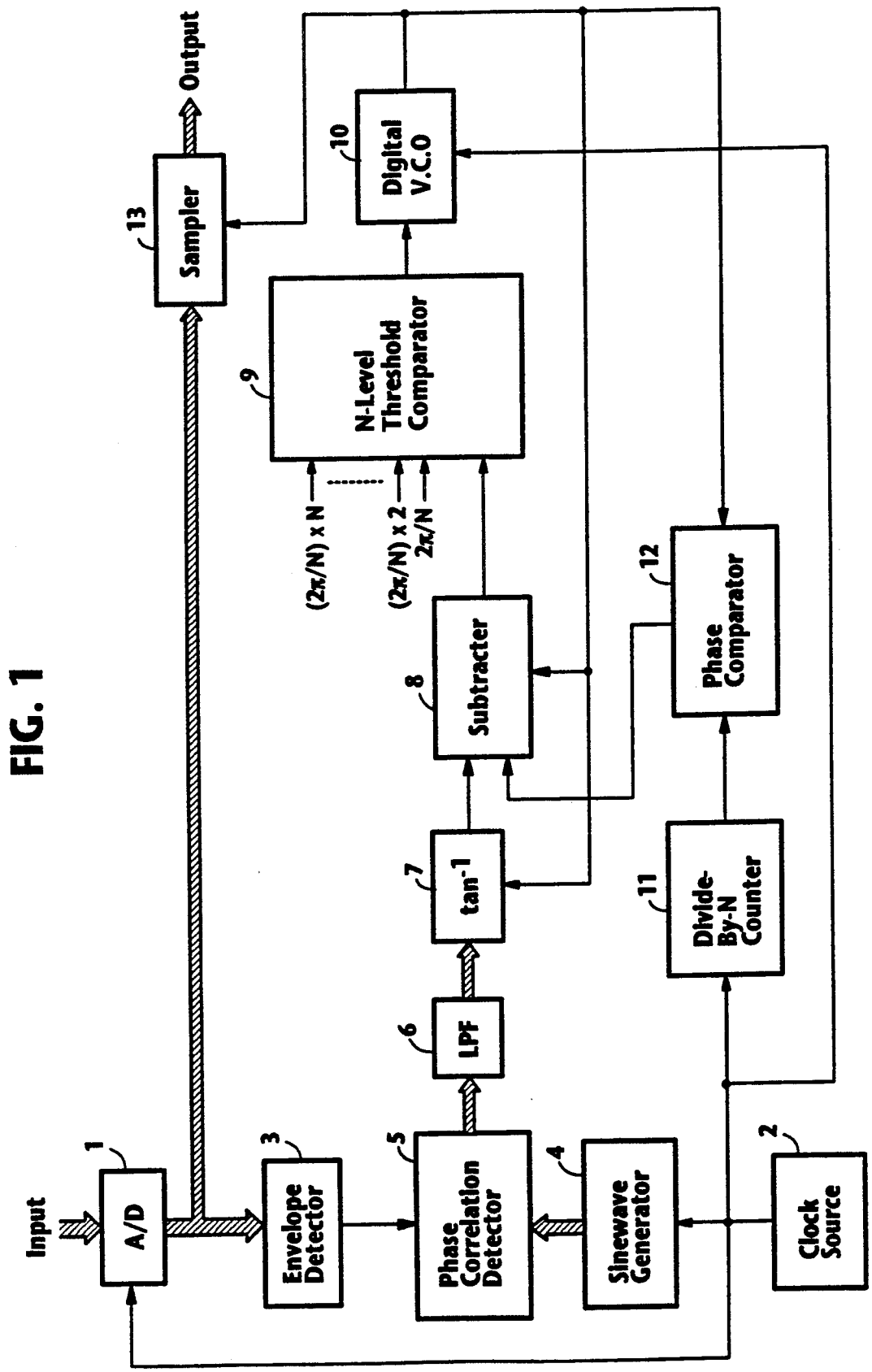
FIG. 1 is a block diagram of an APSK demodulator according to a first embodiment of the present invention.

Referring now to FIG. 1, there is shown an APSK (amplitude and phase shift keying) demodulator incorporating a clock recovery circuit according to a first embodiment of the present invention.

An amplitude and phase shift keyed signal from a transmitting site is received and orthogonally detected to produce an orthogonal APSK signal, which is applied to an analog-to-digital converter 1. A/D converter 1 samples the APSK signal at intervals $T_s$ of the clock supplied from a clock source 2 and quantizes the samples into a multibit digital signal of complex value. The frequency $f_s$ of the clock source 2 is N (where N is an integer) times higher than the frequency $f_c$ of the transmitted clock. An envelope detector 3 is coupled to the output of A/D converter 1 to derive a signal $X(nT_s)$ representative of the envelope of the transmitted carrier (where $T_s = 1/f_s$).

The clock source is connected to a sinewave generator 4 which may be implemented with a read-only memory in which orthogonal instantaneous values of a sinusoidal waveform are stored and a counter for counting the clock to produce a binary count. The binary count is applied to the ROM as an address signal to generate orthogonal versions of a sinusoid having a frequency 1/N of the clock frequency $f_s$.

The outputs of the envelope detector 3 and sinewave generator 4 are coupled to a phase correlation detector 5 in which their relative phase correlation is detected to produce a phase correlation output of complex value which is given by $Y(nT_s) = X(nT_s)\exp\{-j2\pi(f_s/N)nT_s\}$, (where $n = 0, 1, 2 \ldots$).

The phase correlation output is applied to a digital low-pass filter 6 in which it is averaged out over time and fed into an arctangent calculator 7 in response to a sample clock supplied from a digital voltage-controlled oscillator 10 at intervals $T_c$ (where $T_c$ is equal to $1/f_c$ and is 1/N of the clock intervals $T_s$). At intervals $T_c$, arctangent calculation is performed by arctangent calculator 8 between the real and imaginary components of the complex values to produce a signal representative of the phase difference between the clock frequency of the incoming signal and the local clock frequency. The output of arctangent calculator 7 is coupled to a subtracter 8 to which the output of a phase comparator 12 is also applied.

The output of subtracter 8 is compared by an N-level threshold comparator 9 with successive reference values represented by $2\pi/N$, $(2\pi/N)\times 2$, $(2\pi/N)\times 3$, ... $2\pi/N$. If the instantaneous value of the signal from subtracter 8 falls in one of the amplitude intervals between successive reference values, the comparator 9 produces a digital signal representing that interval.

The output of threshold comparator 9 is applied as a phase control signal to a digital voltage-controlled oscillator 10 which is clocked at intervals $T_s$ by clock source 2 to generate a sampling clock frequency $f_c$ whose phase timing is determined at intervals $T_s$ in accordance with the output of threshold comparator 9.

A divide-by-N counter 11 is connected to clock source 2 to divide its frequency by a factor N to produce a sampling clock at intervals $T_c$, which is applied to the phase comparator 12 for making a phase comparison with the output of digital V.C.O. 10.

The difference between the outputs of arctangent calculator 7 and phase comparator 12 is detected by subtracter 8, compared with successive threshold values by comparator 9. The output of comparator 9 indicates a phase error of the $f_c$ sample clock. At source clock intervals $T_s$, voltage-controlled oscillator 10 controls the phase angle of the $f_c$ sampling clock according to the output of subtracter 9 and recovers the transmitted clock timing.

More specifically, the range of signals which appear at the output of subtracter 8 vary between 0 and $2\pi$ and this range is divided into N equal intervals corresponding to the number of $T_s$-clock instants which exist during interval $T_c$. The N amplitude levels are assigned respectively to the reference values. Since V.C.O. 10 is clocked at N times during each interval $T_c$ for phase determination, and since threshold comparator 9 produces a unique value for each of N amplitude levels, a distinct value of phase error can be derived for each phase control timing. Therefore, the frequency-$f_c$ output of V.C.O. 10 can be precisely phase-controlled with respect to the transmitted clock. In addition, the output of subtracter 8, which may vary in a small range, can be transformed into a wider range of discrete values by appropriately determining each of the assigned unique values.

Through the feedback operation, the phase difference detected by phase comparator 12 thus varies with a minimum amount of $2\pi/N$ for each phase control timing.

The orthogonal digital outputs from A/D converter 1 are also applied to a sampler 13 in which they are stored at intervals $T_s$ and sampled at intervals $T_c$ in response to the output of voltage-controlled oscillator 10 to produce digital samples of complex value as an output of the demodulator.

It will be seen that envelope detector 3, sinewave generator 4, correlation detector 5, low-pass filter 6 and arctangent detector 8 constitute an open loop. Since the frequency difference between the transmitted clock and the locally generated clock is considerably small, the open loop circuit is capable of generating a phase estimate of the transmitted clock. On the other hand, subtracter 8, comparator 9, frequency controller 10 and phase comparator 12 constitute a wideband phase locked loop for tracking a phase variation caused by the frequency difference between the transmitted clock and local clock. The phase locked loop has a greater noise bandwidth than the bandwidth of low-pass filter 6. As a result, the signal to noise ratio of the recovered clock is exclusively determined by the bandwidth of low-pass filter 6, and therefore the demodulator as a whole can be considered to operate in a quasi-open loop. The demodulator of this invention is thus capable of continuously tracking slow phase variations which may occur during a continuous transmission.

The demodulator of this invention is essentially a quasi-open loop system formed by an open-loop clock phase estimator and a wideband phase locked loop. Since the response time of low-pass filter 6 is a critical factor for establishing clock synchronization, clock synchronization can be established in a short, invariable length of time.

Figure 2:
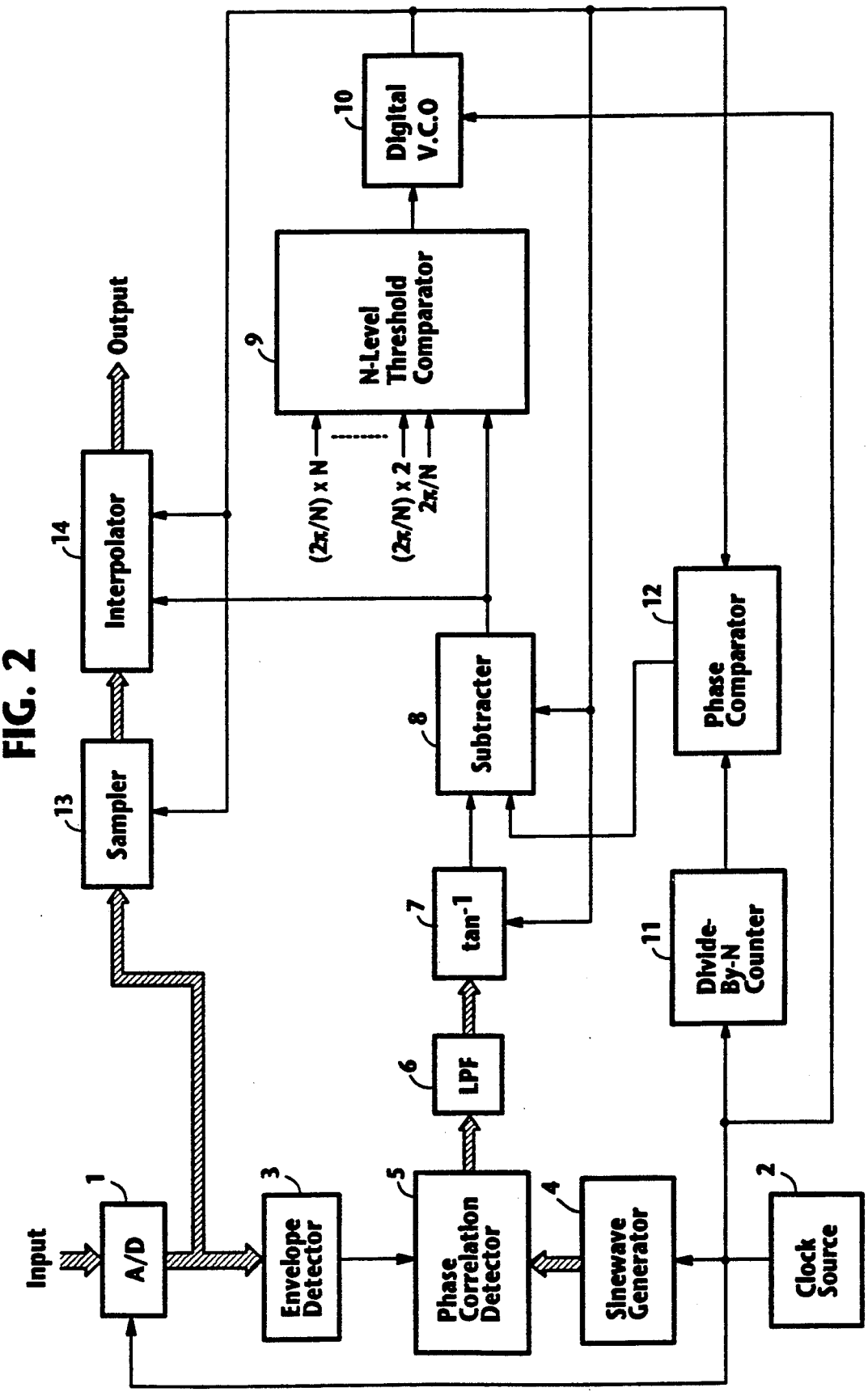
FIG. 2 is a block diagram of an APSK demodulator according to a second embodiment of the present invention.

A second embodiment of the present invention is shown in FIG. 2 which differs from the first embodiment by the provision of an interpolator 14 which is coupled at the output of sampler 13. Interpolator 14 receives the output of digital V.C.O. 10 to sample the output of sampler 13 as successive candidate signals and determines an optimum signal which may exist between such candidate signals using the output of subtracter 8.

Since the output of interpolator 14 is precisely timed with the correct sampling instant, the present embodiment allows a design in which the number of digital samples to be derived by A/D converter 1 can be reduced advantageously in comparison with that of the first embodiment.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A clock recovery circuit for APSK (amplitude and phase shift keyed) signals, comprising:
   a clock source for generating a first clock at a frequency N times higher than a clock frequency of a received APSK signal;
   A/D (analog-to-digital) converter means for sampling the APSK signal in response to the first clock and quantizing the sampled APSK signal to produce orthogonal digital samples;
   envelope detector means coupled to the A/D converter means for generating a signal representative of the envelope of said orthogonal digital samples;
   sinewave generator means for generating orthogonal sinusoidal signals having a frequency which is 1/N of the frequency of said first clock;
   correlation detector means for generating orthogonal signals representative of phase correlations between the orthogonal sinusoidal signals and the envelope representative signal;
   low-pass filter means coupled to the correlation detector means for generating orthogonal signals representative of average values of the orthogonal correlation signals;

arctangent calculator means for generating a signal representative of the arctangent between the orthogonal signals from the low-pass filter means;

means for generating a second clock at a frequency which is 1/N of the frequency of the first clock;

phase comparator means for generating a signal representative of a phase difference between the second clock and a sample clock;

subtracter means coupled to the arctangent calculator means and the phase comparator means for generating a signal representative of the difference between the arctangent representative signal and the phase difference representative signal;

threshold comparator means for comparing the output of the subtracter means with N successive reference values for generating one of N output values respectively corresponding to the N reference values if the output of subtracter means corresponds to one of the reference values;

a digital voltage-controlled oscillator (VCO) for generating said sample clock at a frequency which is 1/N of the frequency of the first clock and varying the timing of the sample clock in response to the first clock in accordance with the output of the threshold comparator means; and sampler means for sampling said orthogonal digital samples from the A/D converter means in response to said sample clock.

2. A clock recovery circuit as claimed in claim 1, wherein the subtracter means, the threshold comparator means, the VCO and the phase comparator means constitute a phase locked loop having a noise bandwidth greater than the bandwidth of the low-pass filter means.

3. A clock recovery circuit as claimed in claim 1, wherein each of the successive reference values is represented by $(2\pi/N) \times M$, where M is an integer in the range between 1 and N.

4. A clock recovery circuit as claimed in claim 1, further comprising an interpolator coupled to the output of the sampler means for receiving samples from the sampler means in response to the sample clock from the VCO as candidate values and interpolating a sample which may exist between the candidate values in accordance with the output of the subtracter means.

5. In a clock recovery circuit for APSK (amplitude and phase shift keyed) signals, a method comprising:

a) generating a first clock at a frequency N times higher than a clock frequency of a received APSK signal;

b) sampling the received APSK signal in response to the first clock and quantizing the sampled APSK signal to produce orthogonal digital samples;

c) generating a signal representative of the envelope of said orthogonal digital samples;

d) generating orthogonal sinusoidal signals having a frequency which is 1/N of the frequency of said first clock;

e) generating orthogonal signals representative of phase correlations between the orthogonal sinusoidal signals and the envelope representative signal;

f) low-pass filtering the orthogonal phase correlation representative signals;

g) generating a signal representative of an arctangent between the low-pass filtered orthogonal phase correlation representative signals;

h) comparing a sample clock and a second clock having a frequency which is 1/N of the frequency of the first clock to detect a phase difference therebetween and generating a signal representative of the phase difference;

i) detecting a difference by subtraction between the arctangent representative signal and the phase difference representative signal;

j) comparing the difference detected by the step (i) with N successive reference values and generating one of N output values respectively corresponding to the N reference values if the difference corresponds to one of the reference values;

k) generating said sample clock at a frequency which is 1/N of the frequency of the first clock and varying the timing of the sample clock in response to the first clock in accordance with the output value derived by the step (j); and l) sampling the orthogonal digital samples generated by the step (b) in response to the sample clock.

6. A method as claimed in claim 5, wherein each of the successive reference values is represented by $(2\pi/N) \times M$, where M is an integer in the range between 1 and N.

7. A method as claimed in claim 5, further comprising the steps of carrying out interpolation on samples derived by the step (l) in accordance with the difference detected by the step (i) to produce an interpolated sample.

* * * * *